United States Patent
Kelsey et al.

(10) Patent No.: US 7,381,787 B2
(45) Date of Patent: Jun. 3, 2008

(54) POLYTRIMETHYLENE TEREPHTHALATE HAVING A LOW LEVEL OF ACROLEIN AND A PROCESS FOR PRODUCING THE SAME

(75) Inventors: Donald Ross Kelsey, Guerneville, CA (US); Cecilia Zuqi Tse, Katy, TX (US); Robert Lawrence Blackbourn, Houston, TX (US); Holger Georg Bachmann, Weiterstadt (DE); Eckhard Seidel, Frankfurt am Main (DE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 11/226,176

(22) Filed: Sep. 14, 2005

(65) Prior Publication Data

US 2006/0084783 A1 Apr. 20, 2006

(51) Int. Cl.
*C08G 63/87* (2006.01)
*C08G 63/00* (2006.01)

(52) U.S. Cl. ........... 528/286; 528/275; 528/287; 528/298; 528/302; 528/308; 528/308.6; 528/308.8

(58) Field of Classification Search ......... 528/275, 528/286, 287, 298, 302, 308, 308.6, 308.8; 524/706, 709, 710, 713
See application file for complete search history.

(56) References Cited

U.S. PATENT DOCUMENTS 3,366,597 A   1/1968   Fort, Jr. ................ 260/40
5,599,900 A   2/1997   Bhatia .................. 528/491
5,744,572 A   4/1998   Schummann et al. ..... 528/286
5,798,433 A   8/1998   Schmidt et al. ......... 528/279
6,093,786 A   7/2000   Kelsey ................. 528/271
6,242,558 B1  6/2001   Kelsey ................. 528/206
6,277,947 B1  8/2001   Kelsey et al. .......... 528/279

FOREIGN PATENT DOCUMENTS

| EP | 0589197 A1 | 8/1993 |
| EP | 1142955 A1 | 10/2001 |
| EP | 1347005 A1 | 9/2003 |
| EP | 1426395 A1 | 6/2004 |
| JP | 49125494   | 11/1974 |

OTHER PUBLICATIONS

International Search Report for PCT/US2005/032736 of Jan. 24, 2006.
Written Opinion for PCT/US2005/032736 of Jan. 24, 2006.

*Primary Examiner*—Duc Truong

(57) ABSTRACT

The present invention provides a process of reducing acrolein by product from polytrimethylene terephthalate using selected phosphorus compounds to contact the polytrimethylene terephthalate or reactants in the process of producing polytrimethylene terephthalate. The selected phosphorus compounds are retained in the polytrimethylene terephthalate. The present invention also provides polytrimethylene terephthalate compositions containing amounts of phosphorus compounds.

15 Claims, No Drawings

POLYTRIMETHYLENE TEREPHTHALATE HAVING A LOW LEVEL OF ACROLEIN AND A PROCESS FOR PRODUCING THE SAME

FIELD OF THE INVENTION

The present invention relates to a process for producing polytrimethylene terephthalate having low levels of acrolein in the final polymer and a polytrimethylene terephthalate polymer composition.

BACKGROUND OF THE INVENTION

Poly(trimethylene terephthalate) (PTT) is primarily a linear aromatic polyester which can be prepared from the condensation polymerization of 1,3-propanediol (PDO) and terephthalic acid (TPA). Processes for making this polymer have been known for some time. For example, a process for making PTT is described in U.S. Pat. No. 3,366,597. An atmospheric pressure process for making PTT is described in U.S. Pat. No. 5,599,900. A continuous all melt low pressure process for making PTT is described in U.S. Pat. No. 6,277,947. This continuous all melt low pressure process makes PTT with a high enough intrinsic viscosity so that solid state polymerization of the PTT is not required. In most prior processes, solid state polymerization was required in order to increase the intrinsic viscosity to an acceptable commercial value. Solid state polymerization is also advantageous because the final product is low in acrolein content but solid state polymerization has the disadvantage that the PTT pellets are friable.

It is known that the addition of a hindered phenol to polytrimethylene terephthalate can help reduce the amount of acrolein generated when the PTT comes into contact with air. To date, this is not considered true for phosphorus compounds because phosphorus compounds reduce the amount of acrolein only under an inert atmosphere when added during the polymerization process, and do not reduce the amount of acrolein formed when the polymer is heated under air. U.S. Pat. No. 6,093,786 describes a process for making PTT which has a reduced tendency to form acrolein when heated in air. This process involves the addition, to the polycondensation reaction, of a hindered phenol and an aromatic organophosphite containing a trivalent phosphorus group of the formula $(ArO)_wP$, in which AR is an aryl group and w is an integer from 1 to 3.

Example 12 of U.S. Pat. No. 6,093,786 describes that using tris(2,4-di-t-butylphenyl)phosphite during polymerization to make PTT did lower the amount of acrolein found in the pellets. However, the results of that example shown in Table 3 (before the solid state polymerization step) show that the retention of the phosphite in the final polymer is poor, i.e., a maximum amount of 26 ppm phosphorus when starting with either 50 or 75 ppm of the phosphite. Example 20, Table 7, shows that a high amount of the phosphorus compound is contained in the PDO distillate which is the PDO which is recovered from the process for recycle.

Any of the phosphorus species which volatizes during the process of making PTT can contaminate the PDO distillates and this contamination can interfere with the purification of these distillates for recycle. Even the nonphosphorus parts of some additives can interfere with PDO purification. For example, IRGAFOS™ 168 additive generates volatile 2,4-di-t-butylphenol which complicates the fractional distillation of the recovered PDO. In a preferred embodiment of the process of U.S. Pat. No. 6,277,947, recovered excess PDO is directly recycled from vacuum spray loops without purification. The phosphorus compounds and their byproducts can interfere with the polymerization if recycled into the PTT process; for example, by reducing the activity and efficiency of the process catalysts. Furthermore, volatile phosphorus compounds, the compounds themselves or phosphorus-containing degradation products of the compounds, can interfere with the operation and efficiency of catalytic oxidizers used to destroy volatile by product streams from the process because phosphorus compounds poison the catalysts commonly used in such oxidizers.

Therefore, it can be seen that it would be useful to have a process, particularly an all-melt process without solid-state polymerization, for making PTT which utilizes phosphorus compounds to reduce the amount of acrolein and which are retained to a high degree in the final PTT product from the process.

U.S. Pat. No. 5,744,572 describes a process for the acceleration of the polycondensation of polyester, i.e. meaning polyethylene terephthalate (PET). From 30 to less than 500 ppm, typically from about 120 ppm to about 300 ppm, of a phosphorus compound which is a carboxy phosphonic acid is added prior to precondensation to accelerate the polycondensation of the polyethylene terephthalate. For the production of PTT, the addition of large amounts of the phosphorus compounds is a disadvantage because they tend to slow down the polycondensation rate which results in a polymer with a lower intrinsic viscosity over the same reaction time.

SUMMARY OF THE INVENTION

In one embodiment, the present invention provides a process of reducing acrolein by product from polytrimethylene terephthalate, comprising contacting a phosphorus compound selected from the group consisting of a phosphorus compound of formula I, a phosphorus compound of formula II, a phosphorus compound of formula III, a phosphorus compound of formula IV, a phosphorus compound containing an aromatic acid, a phosphate containing a hydroxyalkyl group, carboxyethyl phosphonic acid and its corresponding esters with 1,3-propanediol, triethyl-3-phosphonopropionate, 3-hydroxypropyl phosphonoacetate, 3-hydroxypropyl phosphate, and tetraethyl methylenediphosphonate with a) 1,3-propanediol, terephthalic acid, and/or polytrimethylene terephthalate in a process of producing polytrimethylene terephthalate; or b) 1,3-propanediol, dimethylterephthalate, and/or polytrimethylene terephthalate in a process of producing polytrimethylene terephthalate; or c) molten polytrimethylene terephthalate such that at least 1 ppm of phosphorus, based on the total amount of polytrimethylene terephthalate, is retained in the polytrimethylene terephthalate; wherein:

formula I is

A-O—B—O—C     (I)

wherein A is a phosphate, phosphonate, or phosphite moiety, B is the residuum of 1,3-propanediol, and C is hydrogen or a carboxylate ester moiety;

formula II is

Y—O—R'—O-Z     (II)

wherein Y is a phosphate, phosphonate, or phosphite moiety, R' is the residuum of an aliphatic glycol having from 2 to 12 carbon atoms, and Z is hydrogen or a carboxylate ester moiety;

formula III is

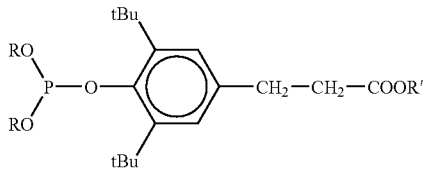

(III)

wherein R is an aliphatic group having 1-12 carbons, and $R_1$ and $R_2$, independently, are hydrogen or an alkyl or aryl moiety having 1-20 carbons; and wherein formula IV is

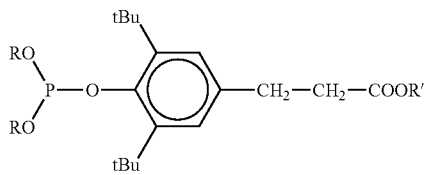

(IV)

wherein R and R', independently, are aliphatic moieties having 1-12 carbons.

In another embodiment the present invention also provides a composition comprising polytrimethylene terephthalate containing from about 1 to about 100 ppm of phosphorus, based on the total amount of polytrimethylene terephthalate, in the form of a phosphorus compound which has reacted with the polytrimethylene terephthalate wherein said phosphorus compound is selected from a group of phosphorus compounds consisting of a phosphorus compound of formula I, a phosphorus compound of formula II, a phosphorus compound of formula III, a phosphorus compound of formula IV, a phosphorus compound containing an aromatic acid, a phosphite containing a hydroxyalkyl group, carboxyethyl phosphonic acid and its corresponding esters with 1,3-propanediol, triethyl-3-phosphonopropionate, 3-hydroxypropyl phosphonoacetate, 3-hydroxypropyl phosphate, and tetraethyl methylenediphosphonate wherein formula I is

A—O—B—O—C  (I)

wherein A is a phosphate, phosphonate, or phosphite moiety, B is the residuum of 1,3-propanediol, and C is hydrogen or a carboxylate ester moiety;

formula II is

Y—O—R'—O-Z  (II)

wherein Y is a phosphate, phosphonate, or phosphite moiety, R' is the residuum of an aliphatic glycol having from 2 to 12 carbon atoms, and Z is hydrogen or a carboxylate ester moiety;

formula III is

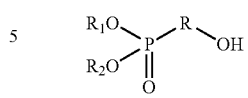

(III)

wherein R is an aliphatic group having 1-12 carbons, and $R_1$ and $R_2$, independently, are hydrogen or an alkyl or aryl moiety having 1-20 carbons; and wherein formula IV is

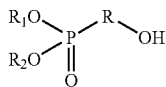

(IV)

wherein R and R', independently, are aliphatic moieties having 1-12 carbons. In one embodiment, the invention provides a method for producing a polytrimethylene terephthalate yarn comprising melt-spinning the polytrimethylene terephthalate composition.

In another embodiment the invention provides a composition of polytrimethylene terephthalate with an acrolein content of less than about 20 ppm, a phosphorus content of from 5 ppm to 50 ppm and intrinsic viscosity of about 0.7 to about 1.2 dl/g, Hunter color values of L greater than about 75 and b less than about 5, and a filter value of less than about 30 bar·cm²/kg.

For purposes of this description, the term "residuum" as used in formula I is the —$CH_2$—$CH_2$—$CH_2$-group that forms 1,3-propanediol with the two hydroxyl endgroups. In the case of formula II, "residuum" means a divalent aliphatic group, preferably a —$(CH_2)_x$— group, that forms an aliphatic glycol with the two hydroxyl endgroups.

For purposes of this description, all parts per million (ppm) numbers regarding phosphorus-containing compound(s) refer to parts per million of the phosphorus in the phosphorus-containing compound(s).

DETAILED DESCRIPTION OF THE INVENTION

Polytrimethylene terephthalate (PTT) can be made by the transesterification of dimethylterephthalate (DMT) with 1,3-propanediol (PDO) followed by polycondensation. PTT can also be made by esterification of PDO with terephthalic acid (TPA) followed by optional prepolycondensation of the reaction product and polycondensation, preferably with a mole excess of PDO and, also preferably, wherein the reaction conditions include maintenance of relatively low concentrations of PDO and TPA in the melt reaction mixture. The preferred PTT process of the present invention is the continuous PTT process which is described in U.S. Pat. No. 6,277,947 which is herein incorporated by reference. However, the polymerization of PTT can be carried out in either batch or continuous mode.

In the preferred process of the present invention, TPA is reacted with PDO to prepare PTT wherein the conditions in the esterification step are carefully regulated to ensure production of a high intrinsic viscosity (IV) PTT without the necessity of a solid state polymerization step. The important conditions are believed to be the instantaneous concentration of PDO monomer and TPA monomer in the reaction mass, which is affected by the reaction temperature and monomer addition rate.

In the esterification step, the instantaneous concentration of unreacted PDO in the reaction mass is preferably maintained relatively low. This is accomplished by regulation of pressure and monomer feed. PDO and TPA are fed to the reaction vessel in a total feed molar ratio within the range of about 1.1:1 to about 3:1. Selection of the diol:diacid ratio within this preferred relatively narrow range is a factor in achieving the desired product quality. The preferred PDO: TPA feed ratio is from about 1.1:1 to about 1.5:1, most preferably about 1.1:1 to about 1.2:1, to minimize the amount of acrolein produced. In batch reactions, this is difficult to calculate. It is controlled by the paced feed molar ratio which is generally lower than the described total molar ratio above, i.e., about 1.1:1 to 1.4:1. It is also preferred to add the PDO and TPA gradually so as to allow time to allow the conversion to ester to take place and keep the PDO and TPA concentrations low.

Also, to maintain the desired instantaneous concentration of PDO, it is preferred that a relatively low reaction pressure be maintained in the esterification step. Conventional PTT processes employ pressures greater than atmospheric to promote reaction between the monomers and to eliminate the need for an esterification catalyst. In the preferred process of the present invention, the esterification reaction pressure is maintained below about 3 bar (0.3 MPa) absolute, generally within the range of about 0.7 to about 1.5 bar (0.07-0.15 MPa) absolute. Because PDO boils at about 214° C. at atmospheric pressure and the esterification reaction is conducted at 240° C. and above, the esterification conditions promote efficient removal of excess or unreacted PDO from the reaction medium. The temperature of the esterification step is preferably maintained as low as reasonably possible, generally within the range of about 240 to about 270° C. The time of the esterification step will-typically range from about 1 to about 4 hours.

An esterification catalyst is optional but preferred in an amount of about 5 ppm to about 100 ppm (metal), preferably about 5 ppm to about 50 ppm, based on the weight of the final polymer. The esterification catalyst is preferably of relatively high activity and resistant to deactivation by the water by product of this step. The currently preferred catalyst for the esterification step are titanium and zirconium compounds, including titanium alkoxides and derivatives thereof, such as tetra(2-ethylhexyl)titanate, tetrastearyl titanate, diisopropoxy bis(acetylacetonato)titanium, di-n-butoxy-bis(triethanolaminoato)titanium, tributylmonoacetyl titanate, triisopropylmonoacetyl titanate, and tetrabenzoic acid titanate; titanium complex salts such as alkyl titanium oxalates and malonates, potassium hexafluoro titanate and titanium and titanium complexes with hydroxy carboxylic acids such as tartaric acid, citric acid, or lactic acid, catalysts such as titanium dioxide/silicon dioxide coprecipitate and hydrated alkaline-containing titanium dioxide; and the corresponding zirconium compounds. Catalysts of other metals, such as antimony, tin, zinc, and the like, can also be used. The currently preferred catalyst for esterification and polycondensation is titanium tetrabutoxide.

A precondensation (prepolymerization) step is optional in this process but such a step is preferable in order to obtain high IV PTT. If such a step is carried out, the pressure on the esterification product mixture is reduced to less than 200 mbar (0.02 MPa), and the temperature is maintained within the range of about 250 to about 270° C. PDO and by product water are removed overhead. The time required for the step will generally be less than about 2 hours. The prepolymerization step, particularly in the continuous mode, is preferably carried out in two vacuum stages, wherein the pressure is decreased in the second vacuum stage.

For the polycondensation (or polymerization) step of this process, the reaction mixture is maintained under vacuum, preferably within the range of about 0.2 to about 2.5 mbar (2-25 Pa), and at a temperature within the range of about 245 to about 275° C. In general, the polycondensation step will require about 1 to about 6 hours to reach the desired molecular weight (IV). The polycondensation step is more suitably carried out in a high surface area generation reactor capable of large vapor mass transfer, such as a cage-type basket, perforated disc, disc ring, or twin screw reactor. The polycondensation is carried out in the presence of a metal polycondensation catalyst, preferably a titanium compound, as discussed above because of the high activity of these metals. The currently preferred polycondensation catalyst is titanium butoxide, preferably present in an amount within the range of 25 to 100 ppm titanium.

PDO may be removed from any one, two, or all of the reaction steps as a vapor and recovered. The process preferably includes recovering all or at least a part of the PDO removed as vapor from the process stages of esterification, prepolycondensation, and polycondensation. This PDO may be condensed, collected, and recycled back to the process, preferably to the point of the reactants' paste preparation or to the esterification stage. In one embodiment of this invention, the phosphorus compound is incorporated into the condensed PDO before it is recycled.

The phosphorus compound added or formed in situ is of the type that will both suppress the formation of acrolein during the reactions which form PTT and be retained to a high degree in the final product. High retention of the phosphorus moiety in the polymer is important to minimize as much as possible the amount of the phosphorus species which is volatilized during the process. These species can contaminate the PDO distillates and this can interfere with the purification of these distillates for recycle. In the case of direct recycle of recovered excess PDO according to a preferred embodiment of the present invention as described in U.S. Pat. No. 6,277,947, which is herein incorporated by reference, the volatile phosphorus compounds incorporated in the excess PDO from the vacuum spray loops without purification before recycle can interfere with the polymerization, for example, by reducing the activity and efficiency of the process catalysts. Furthermore, volatile phosphorus compounds can interfere with the operation and efficiency of catalytic oxidizers used to destroy volatile by product streams from the process because the phosphorus compounds poison the catalysts commonly used in such oxidizers.

The phosphorus compound of the present invention is added to the process for producing PTT, or after melting pelletized PTT. It may be added at the beginning of the process, such as being mixed with one or both of the feed reactants or added independently, during the process, such as in the esterification stage or in the optional prepolycondensation stage or in the polycondensation stage, after polycondensation while the PTT is still in molten form, or after the PTT has been pelletized when it is reduced to molten form again for any reason including by the end user during an extrusion operation.

The presence of or facile formation of a reactive hydroxyl group or a reactive carboxyl group in the phosphorus compounds used in this invention is important for high retention of the phosphorus moiety in the PTT. We theorize that these groups provide a means to attach phosphorus compounds to the polymer chain. Examples of such groups are a 3-hydroxypropyl group and a propionic acid or ester group.

Preferred phosphorus compounds for use in the present invention include carboxy ethyl phosphonic acid (3-phosphonopropionic acid, CEPA) and its esters with PDO, triethyl-3-phosphonoproprionate (TE3PT-the triethyl ester of CEPA), 3-hydroxypropylphosphono acetate (HPPA), 3-hydroxypropylphosphate (3-HPP), and diphosphonates including tetraethylmethylene diphosphonate. Phosphites which contain a hydroxy alkyl group, preferably 3-hydroxy propyl, would also reduce the level of acrolein and exhibit high retention in the PTT. Compounds containing an aromatic acid group will also work, including the following examples:

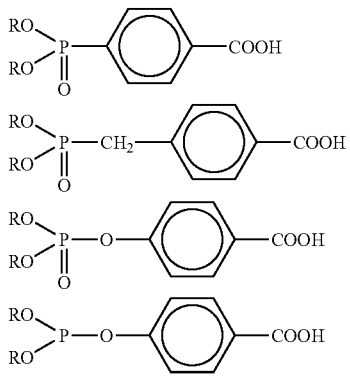

where R is an aliphatic group of 1 to 12 carbon atoms. The acid group provides a "hook" to attach to the polymer. Another type of compound which will work combines the phosphorus moiety with a hindered phenol stabilizer, such as the structure shown in U.S. Pat. No. 6,242,558:

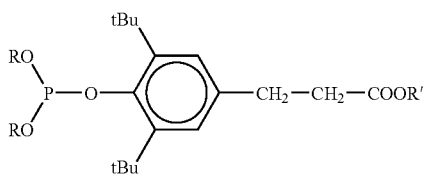

where R' and R are aliphatic groups of 1 to 12 carbon atoms. Another class of phosphorus compounds which will work in the present invention are phosphonates which do not have a carboxyl group but rather have a hydroxy alkyl group such as

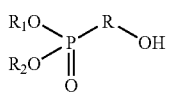

where R is a divalent aliphatic group having 1 to 12 carbon atoms and $R_1$ and $R_2$ are each, independently, hydrogen or $C_1$ to $C_{20}$, preferably $C_1$ to $C_{12}$, alkyl or aryl.

Sufficient phosphorus compound should be added in the process, preferably in the esterification step, to ensure that at least about 1 part per million based on the total amount of PTT, preferably from about 1 to about 100 parts per million, more preferably from about 5 to about 50 parts per million, most preferably from about 15 to about 40 ppm, of the phosphorus compound that contains the reactive hydroxyl group or reactive carboxyl group is retained in the PTT. It is preferred that at least about 70 percent of said phosphorus compound is retained in the PTT, more preferably at least about 75 percent, even more preferably at least about 85 percent, and most preferably at least about 95 percent. It is preferred that the amount of acrolein be reduced by at least about 10 parts per million within a reasonable reaction time to avoid excess color formation. For example, reasonable reaction times for the steps of the process are described above. In order to achieve this result, it is preferred that at least about 10 parts per million of the phosphorus compound containing a reactive hydroxyl group or a reactive carboxylic group be added in the formation of the polytrimethylene terephthalate.

The concentration ranges discussed above are chosen on the basis of at least two factors. These are how much is necessary to decrease the amount of acrolein and the second relates to how the presence of the phosphorus compound decreases the reaction rate of the formation of PTT. As described above, these phosphorus compounds will negatively affect the reaction rate because it affects the efficiency of the catalyst. If too much of the phosphorus compound is used, the reaction rate will slow down to the point where color formation in the polymer becomes a problem. Also, generally, a high reaction rate means that the polymer will have a higher IV in a given period of time and thus it is preferred that excessive concentrations of phosphorus compounds in PTT be avoided in order to obtain a higher IV PTT.

While the structure of the phosphorus compound, the retention of the phosphorus compound in the polymer, and the original amount of phosphorus added to the reaction system are clearly more important factors, the phosphorus compound to catalyst molar ratio is a factor in the affect on polycondensation rates and acrolein reduction. The phosphorus compounds which are effective in the present invention also generally slow down the polymerization rate. A phosphorus compound to catalyst ratio of greater than about 2 will probably affect the reaction rate too much to be practical and therefore it is recommended that this ratio range from about 0.1 to about 2. In some reactor systems, a ratio greater than about 1 may be too high and it is preferred that this ratio range from about 0.2 to about 1, most preferably from about 0.2 to about 0.5. As stated above, it is generally important to avoid slowing down the polymerization rate too much, but the tolerance for slower rates is a practical matter for the particular reactor system being used.

Although not intending the invention to be bound by theory, it is believed that certain additives will react in the esterification mixture with PDO to form esters thereof and it is such an ester that is the reactive phosphorus compound that is retained in the PTT. CEPA will be used as an example in the discussion of this theory. CEPA reacts when it is dissolved in PDO to form a monoester and/or a biester with PDO.

In the experiments in the examples below, CEPA was always dissolved in PDO before addition to the process and thus it is certain that a mixture of CEPA and its PDO carboxy esters was actually added to the reaction mixture. Once in the reactor, further esterification of CEPA occurs rapidly to form its esters with PDO. No evidence was found for the formation of the PDO ester of the phosphonate group of CEPA even after an extended reaction time. This indicates that the relative rate of formation of the carboxylate PDO esters is extremely rapid compared to the rate of formation of phosphonate PDO esters even under PTT polymerization conditions.

The figure below shows the carboxylate esters that can be formed from the reaction of PDO with CEPA and with TE3PP. CEPA and TE3PP are preferred phosphorus compounds useful in the present invention which are retained at a level of about 75 to about 100 percent. The two other chemical formulae (TEPA and TE2PP) are two phosphorus compounds which are retained at less than 75 percent.

Therefore, it is our hypothesis that the reason why TEPA and TE2PP are less reactive in transesterification with PDO is that the acid catalyzed (or Ti-catalyzed) intermediate required to activate the carboxylate to exchange with PDO can form a six member cyclic structure, as shown below, in which the proton (or metal) is also coordinated to one of the phosphonate oxygens. This would reduce or suppress the activation of the C=O carbon to exchange with PDO. In effect, the acidity (electron withdrawing capability) of the proton or metal would be reduced. The corresponding struc-

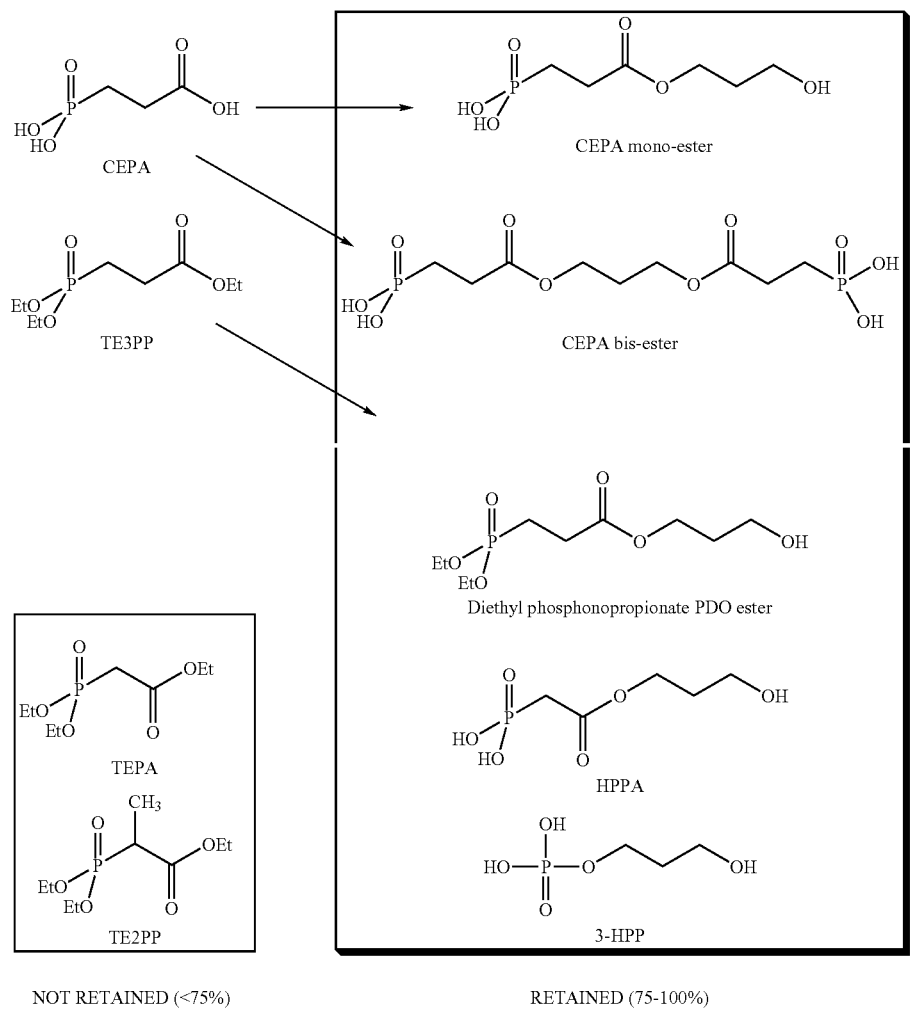

It can be seen that the CEPA esters, TE3PP, and HPPA all have strikingly similar structures, i.e., all three are PDO esters of phosphonylcarboxylic acids or, in the case of CEPA and TE3PP, readily convertible to the corresponding PDO esters, especially under the PTT polymerization reaction conditions. The observation that the triethylester of CEPA (TE3PP) and the PDO ester of phosphonylacetic acid (HPPA) are both highly retained but that the triethylester of phosphonylacetic acid (TEPA) and the triethylester of 2-phosphanolpropionic acid (TE2PP, i.e., TEPA with a methyl substituent) are retained to a much lesser extent, suggests that ester exchange is much faster when the carboxylic group is separated from the phosphorus by two carbons instead of one.

ture for TE3PP would require a seven member cyclic structure which is likely to be less stable and harder to form. So TE3PP transesterification by PDO is faster than its transesterification for TE2PP or TEPA.

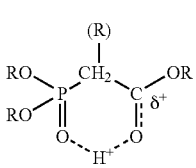

A Proposed Intermediate for Catalyzed TEPA and TE2PP Transesterification

Although 3-HPP does not have the carboxylate moiety, it has a reactive hydroxy propyl group already present which can "tie" the phosphate to the polymer chain by esterification with TPA. This suggests the theory that the carboxylate group may not be essential for effective phosphorus compounds (in terms of acrolein suppression) except to provide a convenient and effective site for the formation of a hydroxypropypl ester from PDO or a PDO endgroup.

The process of this invention can produce polytrimethylene terephthalate with an acrolein content of less than about 20 ppm, a phosphorus content of from 5 ppm to 50 ppm, an intrinsic viscosity of about 0.7 to about 1.2 dl/g, Hunter color values of L greater than about 75, more preferably greater than about 80, and b less than about 5, and a filter value of less than about 30, preferably less than about 10, bar·cm$^2$/kg (see Tables 8, 9, and 12). Such novel PTT is suitable for the down-stream processing of fibers, filaments, film, and engineering plastics.

The color values L, a, and b and L*, a*, and b* in Tables 3-5, 8 and 9 were measured by HunterLab—LabScan XE. Samples were placed into a glass sample cup. The cup was positioned in the sample cup port plate and covered with an opaque cover. The sample was measured six times and the average taken of these measurements. L is a measure of lightness. Zero is black and 100 is white. a is a measure of red to green. Positive values are red, negative values are green, and 0 is neutral. b is a measure of yellow to blue. Positive values are yellow, negative values are blue, and 0 is neutral. The color values in Tables 8 and 9 were measured on crystallized polyester granules (crystallization at 150±5° C./1 hour) in a tristimulus colorimeter containing three photoelectric cells with a red, green, or blue filter. The color values were calculated from the parameters X, and Z according to CIELAB.

EXAMPLE 1

General Procedure. A 5 liter conical reactor equipped with a helical stirrer, hot oil heating, distillation column, and vacuum capability was charged with 1934 g terephthalic acid, 0.6 gm Irganox 1076 stabilizer, 8.5 g of a PDO solution containing cobalt acetate and antifoam agent (15 ppm Co and 0.5 ppm antifoam based on polymer), 2 g of a PDO/acetic acid solution of titanium butoxide catalyst (15 ppm Ti based on terephthalic acid) and 1131 g PDO. The esterification stage was conducted by pressurizing to about 30 psig (1035 kPa), stirring at about 150 rpm and heating to 255~260° C. for a total of about 120-140 minutes while distilling off water and some PDO. The reactor was returned to atmospheric pressure and an additional 8.8 gm of the titanium butoxide catalyst solution (65 ppm Ti based on terephthalic acid) was added. The prepolymerization stage was conducted at about 260° C. and the pressure was gradually reduced to 40 torr (5.3 kPa; 53 mbar) over 30 minutes and held for an additional 15 minutes. Polycondensation was conducted at about 255° C. at about 100 rpm and the pressure was reduced from 40 torr (5.3 kPa; 53 mbar) to about 1 torr (0.13 kPa; 1.3 mbar) over 30 minutes and then further reduced to maximum vacuum over 15 minutes and held for 210 minutes. The maximum vacuum was about "zero" according to the pressure transducer but the actual pressure was estimated to be about 0.3 torr (0.04 kPa) and generally <1 torr (0.13 kPa). At both the prepolymerization and polycondensation stage, additional PDO and water were distilled overhead. At the end of the polycondensation, the stirrer was stopped, the reactor pressurized to about 5-10 psi (34.5-68.9 kPa), and the molten polymer was discharged from the reactor through a heated die and pelletized. The intrinsic viscosity measured on a sample taken at about 15 minutes after beginning of pelletization was 0.71. NMR analysis showed that the final polymer contained 2.7 mole % (1.5 wt %) of DPG units.

The catalyst addition was 15 ppm Ti added with the charge and 65 ppm Ti added at the end of the esterification. In the following Tables, this is shown as "15+65". In some experiments, we increased the catalyst level to 30 ppm Ti in the charge and 90 ppm Ti added at the end of esterification ("30+90").

Phosphorus compounds were either added with the reactor charge or, in the case of compounds soluble in PDO, often at the end of the esterification using a small bomb to add the catalyst to the reactor (under atmospheric pressure) using a small amount of N2 pressure followed by a few milliliters of PDO rinse. The total PDO was kept constant by adjusting the PDO charge for any PDO used to add the compounds.

The intrinsic viscosity (IV) was measured on solutions in 60/40 tetrachloroethane/phenol at 35° C. The amount of acrolein (and allyl alcohol) in the pellets was measured by the usual headspace method of heating the PTT pellets at 200° C. under nitrogen or air for 40 minutes and analyzing the overhead gases by gas chromatography. The amounts of the elements (Co, P, Ti, etc.) were determined by X-ray fluorescence.

The level of acrolein in the pellets produced in a laboratory reactor using a dual helical stirrer (~0.72 IV) increases during the first few minutes of pelletizing and then levels off. Typical results for control runs (without P compounds) are shown in Table 1 and the results for all experiments are shown in Tables 2-4 below. In order to have consistent comparisons, the middle sample was taken at 15 minutes from start of discharge in each experiment and these values are used in the subsequent tables to compare the effects of the phosphorus additives.

TABLE 1

| Batch No. | Beginning | 15 min. | End |
|---|---|---|---|
| 5 (80 ppm catalyst) | 29 | 36 | 36 |
| 16 (120 ppm catalyst) | 24 | 31 | 29 |
| 19 (80 ppm catalyst) | 24 | 38 | 40 |
| 31 (80 ppm catalyst) | 30 | 32 | 31 |
| 44 (80 ppm catalyst) | 22 | 29 | 29 |

The phosphorus compounds screened in this experiment are listed below:

Phosphonates & Diphosphonates

CEPA = Carboxyethyl phosphonic acid (3-phosphonopropionic acid)
TEPA = Triethyl phosphonoacetate
HPPA = 3-hydroxypropyl phosphonoacetate
TE3PP = triethyl 3-phosphonoproprionate (ester form of CEPA)
TE2PP = triethyl 2-phosphonoproprionate (isomer of TE3PP)
TEMDP = Tetraethyl methylenediphosphonate
TEEDP = Tetraethyl ethylene-1,2-diphosphonate
TEPDP = Tetraethyl propylene-1,3-diphosphonate Phosphates TriMePA = Trimethyl phosphate
TrePHPA = Triphenyl phosphate
TEGPA = nominally tristriethyleneglycol phosphoric acid (ethoxylated phosphoric acid - also containing some polyethylene glycol, both free and bound to the phosphate)
3-HPP = 3-hydroxypropylphosphate (Rhodia sample)

Phosphites & Diphosphites

TriMeP = Trimethyl phosphite
IPBDPP = 4,4'-Isopropylidene bis(diisodecylphenyl phosphite)
Irgafos 168 = tris(2,4-di-t-butylphenyl)phosphite
Ultranox 626 = bis(2,4-di-t-butylphenyl)pentaerythritol diphosphite

TABLE 2

| Sample ID | Acrolein Beginning(ppm) | Acrolein 15 min. (ppm) | Acrolein End (ppm) |
|---|---|---|---|
| Exp. 5 Control | 29.4 | 36.3 | 35.8 |
| Exp. 2 Ti/CEPA | 20.4 | 24.5 | 25.8 |
| Exp. 4 Ti/CEPA | 16.7 | 26.6 | 27.0 |
| Exp. 3 Ti/CEPA | 18.4 | 19.3 | 20.0 |
| Exp. 33 Ti/CEPA | 18.6 | 19.1 | 16.5 |
| Exp. 22 Ti/CEPA | 17.2 | 21.5 | 23.9 |
| Exp. 32 Ti/CEPA | 22.4 | 21.5 | 22.8 |
| Exp. 24 Ti/CEPA | 14.9 | 20.7 | 21.9 |
| Exp. 7 Ti/TEPA | 20.6 | 27.5 | 27.2 |
| Exp. 8 Ti/TEPA | 21.8 | 33.0 | 32.2 |
| Exp. 11 Ti/TEPA | 19.3 | 30.3 | 29.9 |
| Exp. 12 Ti/TEPA | 19.0 | 30.8 | 33.7 |
| Exp. 13' Ti/TEPA | 22.7 | 28.9 | 31.8 |
| Exp. 20 Ti/TEPA | 11.3 | 15.9 | 17.1 |
| Exp. 21 Ti/TEPA | 12.3 | 19.9 | 21.7 |
| Exp. 16 Control | 24.2 | 31.1 | 28.9 |
| Exp. 19 Control | 23.9 | 37.5 | 39.7 |
| Exp. 31 Control | 29.5 | 31.8 | 30.5 |
| Exp. 44 Control | 21.5 | 29.3 | 29.0 |
| Exp. 23 Ti/HPPA | 13.1 | 17.8 | 14.2 |
| Exp. 25 Ti/HPPA | 13.4 | 19.9 | 19.8 |
| Exp. 34 Ti/TriMeP | 22.8 | 27.5 | 25.8 |
| Exp. 35 Ti/TriMeP | 22.3 | 27.1 | 28.7 |
| Exp. 36 Ti/TriMePA | 16.6 | 17.2 | 19.4 |
| Exp. 37 Ti/TEGPA | 20.1 | 20.9 | 22.6 |
| Exp. 38 Ti/3-HPP | 25.6 | 40.0 | 35.3 |
| Exp. 45 Ti/3-HPP | 12.0 | 14.2 | 17.1 |
| Exp. 39 Ti/TE3PP | 17.9 | 16.3 | 21.7 |
| Exp. 40 Ti/TE2PP | 19.9 | 19.2 | 25.2 |
| Exp. 41 Ti/Irgafos 168 | 21.3 | 27.6 | 31.1 |
| Exp. 42 Ti/IPBDPP | 18.7 | 25.1 | 28.1 |
| Exp. 43 Ti/TEMDP | 9.9 | 14.9 | 16.1 |
| Exp. 46 Ti/TEMDP | 19.9 | 29.6 | 31.7 |
| Exp. 47 Ti/TEEDP | 24.3 | 29.2 | 31.6 |
| Exp. 48 Ti/TEPDP | 21.4 | 22.5 | 27.3 |
| Exp. 49 Ti/Ultranox 626 | 24.9 | 22.9 | 27.7 |
| Exp. 50 Ti/TriPHPA | 19.4 | 19.6 | 21.9 |
| Exp. 51 Ti/DEABP | 17.8 | 24.3 | 29.0 |

TABLE 3

| Run conditions | Type | Polycondensation | | | | | Pellets | | | | |
|---|---|---|---|---|---|---|---|---|---|---|---|
| | | Cat (ppm) | P charge ppm | Addn Point** | Vacuum (torr) | Final Amps | IV (dl/g) | Acrolein (ppm) | P (ppm) | % P | b* | L* |
| Exp. 5 - Control | | 15 + 65 | | | 0 | 86.8 | 0.71 | 36 | 0 | | 11.0 | 69 |
| Exp. 19 - Control | | 15 + 65 | | | 0.3-0.11 | 89.0 | 0.71 | 38 | 0 | | 11.2 | 71 |
| Exp. 31 - Control | | 15 + 65 | | | 0.35-0.1 | 92.0 | 0.73 | 32 | 0 | | 9.2 | 73 |
| Exp. 44 - Control | | 15 + 65 | | | 0.49-0.22 | 88.0 | 0.72 | 29 | 0 | | 7.9 | 75 |
| Exp. 4: - CEPA (+) | phosphonate acid | 15 + 65 | 36 | end | 0 | 54.4 | 0.64 | 27 | 35 | 97 | 3.5 | 74 |
| Exp. 33 - CEPA (+) | | 15 + 65 | 30 | end | 0.47-0.07 | 68.0 | 0.68 | 19 | 27 | 90 | 2.3 | 71 |
| Exp. 22 - CEPA (+) | | 15 + 65 | 24 | end | 0.3-0 | 79.0 | 0.69 | 22 | 22 | 92 | 7.4 | 72 |
| Exp. 24 - CEPA (+) | | 30 + 90 | 24 | end | 1.3-0 | 83.0 | 0.69 | 21 | 24 | 100 | 10.7 | 71 |
| Exp. 32 - CEPA (+) | | 15 + 65 | 18 | end | 0.9-0.14 | 86.0 | 0.72 | 22 | 16 | 89 | 6.8 | 75 |
| Exp. 20 - TEPA | phosphonate ester | 30 + 90 | 65 | end | 0.3-0.00 | 60.0 | 0.66 | 16 | 36 | 55 | 4.8 | 74 |
| Exp. 21 - TEPA | | 30 + 90 | 45 | end | 0.45-0 | 73.0 | 0.68 | 20 | 26 | 58 | 6.1 | 73 |
| Exp. 8 - TEPA | | 15 + 65 | 36 | end | 0 | 77.0 | 0.68 | 33 | 20 | 56 | 5.7 | 73 |
| Exp. 12 - TEPA | | 15 + 65 | 24 | end | 0 | 85.6 | 0.71 | 31 | 17 | 71 | 7.1 | 73 |
| Exp. 11 - TEPA | | 30 + 90 | 24 | end | 0 | 86.0 | 0.70 | 30 | 13 | 54 | 9.2 | 71 |
| Exp. 43 - TEMDP (+) | di-phosphonate ester | 15 + 65 | 36 | end | 0.49-0.15 | 50.0 | 0.66 | 15 | 39 | 108 | -1.0 | 78 |
| Exp. 46 - TEMDP (+) | | 15 + 65 | 18 | end | 1.1-0.21 | 89.0 | 0.72 | 30 | 19 | 105 | 6.2 | 75 |
| Exp. 47 - TEEDP (+) | | 15 + 65 | 18 | end | 0.43 | 83.2 | 0.71 | 29 | 18 | 100 | 4.9 | 72 |
| Exp. 48 - TEPDP (+) | | 15 + 65 | 18 | end | 0.41-0.31 | 82.7 | 0.73 | 22 | 15 | 83 | 5.4 | 74 |

(+) = Sample in accordance with the present invention

The screening results for phosphorus compounds charged at 36 ppm P based on theoretical yield of polymer are shown in Table 4.

Phosphonates and Diphosphonates

With the exception of TEPA, the phosphonate and diphosphonate esters charged at 36 ppm P showed suppression of acrolein ranging from 15 to 27 ppm (compare control average at 33 ppm). The color (b*) was also lower than b* for the control runs and the L* values were higher than the controls. The improvement in color (b* & L*) was pronounced for CEPA and TEMDP compared to the controls.

However, TEPA and TE2PP were not retained well in the polymer (44-56%) compared to the other phosphonates (81-108%). It is particularly interesting that TE3PP, which is the triethyl ester of CEPA, gave low acrolein and relatively high retention in the polymer but TE2PP, which is the isomer of TE3PP with the phosphorus bonded to the second carbon of the propionate instead of the third carbon, was not retained as well in the polymer (44% vs. 81%). TE2PP is structurally more similar to TEPA.

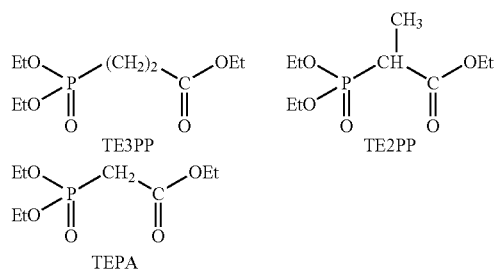

At higher catalyst levels (see Exp. 3, 7 and 25 in Table 4), CEPA appeared to be even more effective at acrolein suppression (19 ppm vs. 27 ppm for Exp. 4) and also highly retained in the polymer (97%). HPPA, the PDO ester of phosphonoacetic acid, also showed good acrolein suppression (20 ppm) and high P retention (78%). HPPA is the PDO ester analog of TEPA and this PDO ester is retained much better than the triethyl ester. The diphosphonate TEMDP was very effective for acrolein suppression and also highly retained in the polymer at the 36 ppm P concentration.

Phosphates

Referring still to Table 4, all of the phosphates tested showed reduction in acrolein in the pellets and beneficial effects on color. However, only 3-HPP, the PDO ester of phosphoric acid, showed high retention in the polymer (92% vs. 56-69% for the other phosphates). Surprisingly, ethoxylated phosphoric acid (TEGPA) was not retained as well as 3-HPP (56% vs. 92%), even though it is supposed to contain hydroxyethyl groups (However, see Table 11 which shows TEGPA retention levels of over 80%).

In the case of triphenyl phosphate, the loss of phosphorus in the overhead was confirmed by analyses of the water and PDO distillates. The prepolymerization distillate collected in the cold traps during the reduction in pressure from atmospheric to about 40 torr (5.3 kPa) showed 176 ppm P, which corresponded to 0.21 gm of TPP out of the 0.91 gm of TPP charged to the reactor. Some of the phosphorus also may have been lost in the vacuum system and the vents.

Phosphites and Diphosphites

Compared to the phosphates and phosphonates, as shown in Table 4, the phosphites were not as effective under our lab reactor conditions for suppressing acrolein. This must be due to the poor retention in the polymer (39-46%), even for the high molecular weight compounds such as Irgafos 168, Ultranox 626 and IPBDPP.

TABLE 4

| Experiment | Type | Ti Cat (ppm) | Addn Point** | Final Amps | IV*** (dl/g) | Acrolein (ppm)*** | P final (ppm) | % P | P/Ti mol | b* | L* |
| --- | --- | --- | --- | --- | --- | --- | --- | --- | --- | --- | --- |
| Exp. 5 - Control | | 15 + 65 | | 86.8 | 0.71 | 36 | 0 | | 0 | 11.0 | 69 |
| Exp. 19 - Control | | 15 + 65 | | 89.0 | 0.71 | 38 | 0 | | 0 | 11.2 | 71 |
| Exp. 4: CEPA (+) | phosphonate acid | 15 + 65 | end | 54.4 | 0.64 | 27 | 35 | 97 | 0.72 | 3.5 | 74 |
| Exp. 8 - TEPA | phosphonate esters | 15 + 65 | end | 77.0 | 0.68 | 33 | 20 | 56 | 0.44 | 5.7 | 73 |
| Exp. 39 TE3PP (+) | | 15 + 65 | end | 57.0 | 0.67 | 16 | 29 | 81 | 0.65 | 8.9 | 76 |
| Exp. 40 TE2PP | | 15 + 65 | end | 77.0 | 0.71 | 19 | 16 | 44 | 0.36 | 5.1 | 76 |
| Exp. 43 TEMDP (+) | di-phosphonate ester | 15 + 65 | end | 50.0 | 0.66 | 15 | 39 | 108 | 0.92 | -1.0 | 78 |
| Exp. 31 - Control | | 15 + 65 | | 92.0 | 0.73 | 32 | 0 | | 0 | 9.2 | 73 |
| Exp. 44 - Control | | 15 + 65 | | 88.0 | 0.72 | 29 | 0 | | 0 | 7.9 | 75 |
| Exp. 36 TriMe Phosphate | phosphate | 15 + 65 | end | 70.0 | 0.70 | 17 | 25 | 69 | 0.55 | 3.4 | 82 |
| Exp. 50 TriPh-phosphate | esters | 15 + 65 | end | 72.0 | 0.70 | 20 | 20 | 56 | 0.46 | 4.3 | 71 |
| Exp. 37 TEGPA | | 15 + 65 | end | 77.0 | 0.71 | 21 | 20 | 56 | 0.45 | 3.8 | 78 |
| Exp. 45 3-HPP (+) | | 15 + 65 | end | 64.0 | 0.67 | 14 | 33 | 92 | 0.71 | 3.3 | 76 |
| Exp. 31 - Control | | 15 + 65 | | 92.0 | 0.73 | 32 | 0 | | 0 | 9.2 | 73 |
| Exp. 44 - Control | | 15 + 65 | | 88.0 | 0.72 | 29 | 0 | | 0 | 7.9 | 75 |
| Exp. 34 TriMe Phosphite | phosphite | 15 + 65 | end | 88.0 | 0.70 | 28 | 15 | 42 | 0.33 | 5.8 | 76 |
| Exp. 35 TriMe Phosphite | esters | 15 + 65 | charge | 91.0 | 0.72 | 27 | 20 | 56 | 0.46 | 6.8 | 74 |
| Exp. 41 Irgafos 168 | | 15 + 65 | charge | 88.0 | 0.71 | 28 | 17 | 47 | 0.39 | 7.8 | 75 |
| Exp. 49 Ultranox 626 | di-phosphite | 15 + 65 | charge | 81.9 | 0.73 | 23 | 17 | 47 | 0.41 | 5.1 | 76 |
| Exp. 42 IPBDPP | esters | 15 + 65 | charge | 91.0 | 0.72 | 25 | 14 | 39 | 0.31 | 8.9 | 73 |
| Exp. 16 - Control | | 30 + 90 | | 85.0 | 0.71 | 31 | 0 | | 0 | 11.2 | 70 |
| Exp. 3: CEPA (+) | phosphonate acid | 30 + 90 | end | 65.0 | 0.66 | 19 | 35 | 97 | 0.48 | 5.7 | 72 |
| Exp. 7 TEPA | phosphonate esters | 30 + 90 | end | 80.0 | 0.69 | 28 | 21 | 58 | 0.29 | 9.0 | 76 |
| Exp. 25 HPPA (+) | | 30 + 90 | end | 75.0 | 0.69 | 20 | 28 | 78 | 0.42 | 7.0 | 72 |

**charge = charged at beginning with PDO and TPA; end = at end of esterification stage
***for 15 minute sample
(+) = Sample of present invention

EXAMPLE 2

Generally, the addition point of the phosphorus compound did not make much difference. Table 5 summarizes the results for compounds added with the initial charge or added at the end of the esterification. CEPA was retained very well in both cases. Retention of TEPA in the polymer was slightly better when added at the end of esterification. Trimethylphosphite was retained slightly better when added at the beginning.

Two additional phosphites, Irgafos and Ultranox, which were added at the beginning because they are not soluble in PDO, are included in this Table. Like trimethylphosphite, addition at the beginning did not result in high retention efficiency, even though both of these compounds have significantly higher molecular weights.

Therefore, a further embodiment of this invention is using the described phosphorus compound(s) and conducting the polymerization process so as to increase the reaction time under vacuum.

EXAMPLE 5

PDO/TPA ratio. Reducing the PDO/TPA feed ratio also results in a reduction in acrolein in the final pellets. The data is shown in Table 6. Because of the influence of reaction time, only data for batches with normal reaction times (and normal IV's about 0.92 dl/g) were included. The number of batches varied from 33 each for PDO/TPA at 1.3 and 1.2 ratio in the feed, 10 batches for 1.16 ratio, and only 2 or 3 batches for the other ratios. In order to avoid skewing the

TABLE 5

| Experiment | Type | Ti Cat (ppm) | Addn Point** | Final Amps | IV*** (dl/g) | Acrolein (ppm)*** | P final (ppm) | % P | P/Ti mol | b* | L* |
|---|---|---|---|---|---|---|---|---|---|---|---|
| Exp. 4 CEPA (+) | phosphonate | 15 + 65 | end | 54.4 | 0.64 | 27 | 35 | 97 | 0.72 | 3.5 | 74 |
| Exp. 2 CEPA (+) | acid | 15 + 65 | charge | 59.5 | 0.65 | 24 | 34 | 94 | 0.79 | 3.6 | 74 |
| Exp. 34 TriMe Phosphite | phosphite | 15 + 65 | end | 88.0 | 0.70 | 28 | 15 | 42 | 0.33 | 5.8 | 76 |
| Exp. 35 TriMe Phosphite | esters | 15 + 65 | charge | 91.0 | 0.72 | 27 | 20 | 56 | 0.46 | 6.8 | 74 |
| Exp. 41 - Irgafos 168 | phosphite | 15 + 65 | charge | 88.0 | 0.71 | 28 | 17 | 47 | 0.39 | 7.8 | 75 |
| Exp. 49 - Ultranox 626 | esters | 15 + 65 | charge | 81.9 | 0.73 | 23 | 17 | 47 | 0.41 | 5.1 | 76 |
| Exp. 7 - TEPA | phosphonate | 30 + 90 | end | 80.0 | 0.69 | 28 | 21 | 58 | 0.29 | 9.0 | 76 |
| Exp. 13 - TEPA | ester | 30 + 90 | charge | 88.9 | 0.72 | 29 | 15 | 42 | 0.22 | 9.0 | 72 |

**charge = charged at beginning with PDO and TPA; end = at end of esterification stage
***15 min. sample
(+) = Sample in accordance with the present invention

EXAMPLE 3

The phosphorus compounds tend to reduce yellow color (b*) and increase "whiteness" (L*), as mentioned in the discussion above (see Tables 3, 4, and 5). Compared to the controls, with average b*=10 and L*=72, the preferred compounds (e.g. CEPA) usually improved b* to between −1 and 9 and/or improved L* to between 72 and 78, depending on the compound, the concentration, and P/Ti ratio.

EXAMPLE 4

Polycondensation Time. Observations from experiments indicate that longer reaction times result in less acrolein in the pellets. Longer polycondensation times also usually resulted in higher molecular weight (IV), so one might assume that the lower acrolein is caused by the molecular weight, e.g. fewer endgroups.

However, an experimental program resulted in the same trend for controls and with added CEPA. In this case, the IVs were generally 0.94 or below (the target IV was usually about 0.9 IV) and the longer reaction times were due to slower rates caused by the CEPA or somewhat higher pressure (less vacuum). Therefore, the decrease in acrolein is most likely related to reaction time and not molecular weight, i.e. reaction time can both determine molecular weight and influence acrolein. The simple explanation for the decrease in acrolein is that it is mass transfer dependent, so longer reaction times under vacuum provide greater opportunity for the acrolein to escape the melt.

data, the values at each PDO/TPA ratio were averaged. The standard deviations are shown in Table 6.

TABLE 6

| PDO/TPA feed (moles) | Acrolein in Pellets (ppm) | Std. deviation | No. of batches |
|---|---|---|---|
| 1.12 | 12 | 1.5 | 3 |
| 1.14 | 14 | 1.4 | 2 |
| 1.16 | 19 | 2.6 | 10 |
| 1.18 | 20 | 1.4 | 2 |
| 1.2 | 21 | 4 | 33 |
| 1.3 | 43 | 9 | 33 |

Therefore, a further embodiment of the invention to reduce acrolein in all-melt PTT pellets is conducting the process at lower PDO/TPA feed ratios, i.e. below about 1.25, combined with addition of the phosphorus compounds of the invention.

EXAMPLE 6

Recycle PDO. The process of producing low acrolein concentration PTT by the addition of phosphorus compounds in accordance with the invention was conducted where PDO was collected from the prepolymerization and polycondensation vacuum spray loops, and adding this PDO, which contained distillate collected from the process as well as virgin PDO charged to the loops, into the feed of the next batch. The acrolein in the product decreased for each subsequent batch. One reason why the acrolein gradually decreased rather than dropped suddenly is that the batch process employs a "heel", so it takes several batches to completely attain the new reaction conditions ("steady state").

So a further embodiment of the process of the present invention is to combine the phosphorus compounds of the invention with recycle of PDO, either direct recycle or recycle after distillation of the recovered PDO.

The results of experiments conducted in the pilot plant with this combination of PDO recycle and CEPA are shown in Table 7. Fifty percent recycled PDO from the spray loops resulted in 5 ppm reduction in acrolein with phosphoric acid added (Runs C-1 and C-4-comparative, not done in accordance with the process of the present invention but processed as set forth in Example 7 herein). Using CEPA in accordance with the process of the present invention, the acrolein was reduced from 16 ppm to 13 ppm even using less CEPA (24 ppm vs. 20 ppm P; runs I-1 and I-4 done in accordance with the process of the present invention as set forth in Example 7 herein). So, the combination of CEPA and recycle achieved a lower acrolein level (13 ppm) than either CEPA alone (16 ppm) or recycle alone (20 ppm).

TABLE 7

| Run | P-Additive | P Conc. [ppm] | PDO | $TiO_2$ [wt.-%] | Acrolein [ppm] | Allyl OH [ppm] |
|---|---|---|---|---|---|---|
| C-1 | $H_3PO_4$ | 10 | virgin | 0.4 | 25 | 5.0 |
| C-4 | $H_3PO_4$ | 10 | recycled* | 0.4 | 20 | 4.0 |
| I-1 | CEPA | 24 | virgin | none | 16 | 4.7 |
| I-4 | CEPA | 20 | recycled* | 0.4 | 13 | 4.1 |

*50% recycled

Any combination of the embodiments described above can be used, e.g., phosphorus compounds in accordance with the present invention plus PDO recycle plus lower PDO/TPA ratio plus longer reaction times.

EXAMPLE 7

Comparative PTT sample 1 (C-1), not prepared in accordance with the process of the present invention, was prepared as follows. During esterification the reactor was connected to a process column to separate the low boiling materials out of the esterification process and to recirculate the distilled propanediol (PDO). During prepolycondensation and polycondensation the reactors were connected to separate condensing and vacuum systems. In this batchwise production of PTT, a part of prepolymer from a preceding prepolymer batch in a quantity of about 42 wt % of the nominal batch size (the heel) was kept back in the esterification reactor for the next reaction cycle for stirring the esterification product and for feeding and heating the raw materials PDO and TPA which were fed to the reactor as a paste including the esterification catalyst and additives. The molar PDO to TPA feed ratio of the paste was 1.3:1. The amount of the catalyst, a catalyst solution of 7 wt. % titanium tetrabutoxide (1 wt. % titanium) in PDO/acetic acid (35 parts titanium tetrabutoxide to 100 parts acetic acid brought to 7 wt. % titanium tetraoxide by addition of PDO), was 270 g titanium tetrabutoxide. Additionally, 760.8 g cobalt acetate (coloring agent) as a 2 wt. % solution in PDO and 558.0 g Irganox 1076, a polymer stabilizer manufactured by CIBA as 10 wt. % slurry in PDO and 0.09 g Antifoam 1500 manufactured by Dow Corning were included in the paste.

The quantity of TPA fed into the esterification reactor was 180 kg. The feed time was 130 minutes. The total cycle time of esterification was 143 minutes at a temperature of 265° C. and a pressure of 1000 mbar (abs.) (0.1 MPa (abs)).

Separation of the low-boiling compounds, mainly process water, from the propanediol in the vapors from the esterification by the process columns and the recirculation of the distilled PDO to the process was carried out continuously during the esterification step. After completion of the esterification step the pressure was lowered to atmospheric pressure and a second portion of 1170.0 g titanium tetrabutoxide-catalyst as solution in PDO/acetic acid was fed into the reactor. After 5 min. of stirring, 66.9 g phosphoric acid (10 ppm P) as a 2 wt. % solution in PDO was added. After a further 5 min. of stirring, 1482.9 g of a $TiO_2$ slurry Hombitan LWSU manufactured by Sachtleben (20 wt. % $TiO_2$ powder in PDO) was added.

After the last additive was added, the precondensation was carried out in 30 minutes at a simultaneous pressure reduction to 50 mbar (abs.) (500 Pa (abs.)). Thereafter, the prepolymer melt was transferred through the prepolymer filter to a disc ring reactor and the polycondensation was started by agitation defined by a standard program of speed control and the pressure was reduced within 45 minutes to 0.5 mbar (5 Pa (abs.)) as final pressure.

During polycondensation, the temperature increased from 260 to 268° C. The total duration of polycondensation indicated in Tables 8 and 9 corresponded to the target viscosity of the polymer, i.e., if the polycondensation is continued for a longer period of time, the intrinsic viscosity of the polymer increases.

At an applied pressure of 55 to 60 bar (550-600 Pa), the polymer melt is discharged from the reactor, granulated and packed.

Comparative PTT Sample 2 (C-2), not prepared in accordance with the process of the present invention, was prepared under the same conditions as Comparative Sample 1 but without feeding of $TiO_2$.

Comparative PTT Sample 3 (C-3), not prepared in accordance with the present invention, was prepared under the same conditions as Comparative Sample 2 but a reduced concentration of phosphoric acid of 33.45 g phosphoric acid as a 2 wt. % solution in PDO was used (5 ppm P).

Comparative PTT Sample 4 (C-4), not prepared in accordance with the present invention, was prepared under the same conditions as Comparative Sample 1 but it used only 50 wt. % virgin PDO. The other 50 wt. % PDO was process PDO (collected condensates).

Invention PTT Sample 1 (I-1), prepared in accordance with the present invention, was prepared under the same conditions as the Comparative Samples 2 and 3 but instead of phosphoric acid, 1354 g CEPA (24 ppm) was added as a 2 wt. % solution in PDO.

Invention PTT Sample 2 (I-2), prepared in accordance with the present invention, was prepared under the same conditions as Comparative Sample 1 but instead of phosphoric acid, 1692 g CEPA (30 ppm) was added as a 2 wt. % solution in PDO.

Invention PTT Sample 3 (I-3), prepared in accordance with the present invention, was prepared under the same conditions as Invention Sample 1 but instead of 1354 g CEPA, 2031 g CEPA (36 ppm) was added as a 2 wt. % solution in PDO.

Invention PTT Sample 4 (I-4), prepared in accordance with the present invention, was prepared under the same conditions as Comparative Sample 4 but instead of the phosphoric acid, 1128 g CEPA was added as a 2 wt. % solution in PDO.

The influence of the phosphorus additives in Comparative Samples C1-C3 and Invention Samples I1-I3 on PTT properties and polycondenation time using virgin PDO is shown in Table 8, and the influence of phosphorus additives in Comparative Sample C4 and Invention Sample I4 on PTT properties and polycondensation time using 50% process-PDO is shown in Table 9.

EXAMPLE 8

A large scale production of polytrimethylene terephalate was conducted to produce PTT having an IV greater than 0.9. Control samples containing no added phosphorus compounds were produced, and various phosphorus compounds were tested in the production of PTT. The production of PTT

TABLE 8

| | Feed conditions/process parameter | | | | Polymer properties | | | | | | |
| --- | --- | --- | --- | --- | --- | --- | --- | --- | --- | --- | --- |
| | P- | P-Conc. | TiO$_2$ | Poly-cond. time | Acrolein | Hunter Color of Chips | | | Cielab Color of Chips | | | IV |
| Ex. | Additive | (ppm) | (wt.-%) | (min) | (ppm) | L | a | b | L* | a* | b* | (dl/g) |
| C-1 | H$_3$PO$_4$ | 10 | 0.4 | 151 | 25 | 81.2 | −3.3 | 4.5 | 85.0 | −3.4 | 4.8 | 0.925 |
| C-2 | H$_3$PO$_4$ | 10 | non | 150 | 26 | 84.7 | −2.3 | 4.2 | 87.8 | −2.4 | 4.4 | 0.910 |
| C-3 | H$_3$PO$_4$ | 5 | non | 153 | 25 | 85.2 | −2.8 | 6.3 | 88.3 | −2.9 | 6.6 | 0.918 |
| I-1 | CEPA | 24 | non | 170 | 16 | 83.5 | −2.3 | 3.6 | 86.9 | −2.4 | 3.8 | 0.915 |
| I-2 | CEPA | 30 | 0.4 | 192 | 11 | 82.7 | −3.2 | 4.2 | 86.2 | −3.3 | 4.4 | 0.916 |
| I-3 | CEPA | 36 | non | 198 | 8 | 85.8 | −2.3 | 3.9 | 88.7 | −2.4 | 4.1 | 0.901 |

TABLE 9

| | Feed conditions/process parameter | | | | Polymer properties | | | | | | |
| --- | --- | --- | --- | --- | --- | --- | --- | --- | --- | --- | --- |
| | | P-Conc. | TiO$_2$ | Poly-cond. time | Acrolein | Hunter Color of Chips | | | Cielab Color of Chips | | | IV |
| Ex. | P-Additive | (ppm) | (wt.-%) | (min) | (ppm) | L | a | b | L* | a* | b* | (dl/g) |
| C-4 | H$_3$PO$_4$ | 10 | 0.4 | 182 | 20 | 82.5 | −3.4 | 4.9 | 86.0 | −3.5 | 5.2 | 0.922 |
| I-4 | CEPA | 20 | 0.4 | 183 | 13 | 83.0 | −3.3 | 4.3 | 86.4 | −3.4 | 4.5 | 0.930 |

Comparison of Invention Samples I-1-4 with Comparative Samples C-1-4 shows that CEPA reduces the acrolein content in PTT to a considerable extent. It was also found that CEPA improves the color values of the chips. Color L is increased (white effect) and Color b is reduced (less yellow). Phosphoric acid has a similar effect on color at similar concentration. The use of H$_3$PO$_4$ in higher concentrations is restricted because of the high volatility of the acid (boiling point 158° C.) and additive losses, corrosion in the overhead systems, poisoning of the off-gas incineration catalyst, problems of waste water treatment, and inhibition of the polycondensation activity of titanium-based catalysts. CEPA has a boiling point of greater than 287° C. and is not volatile at PTT process conditions.

The DPG levels in the PTT samples are comparable for the CEPA and phosphoric acid. CEPA concentrations up to 36 ppm P do not increase the DPG content in the chips. The polycondensation time of the virgin PDO samples is increased by using higher concentration of CEPA phosphorus additive.

As can be seen in Table 9, when CEPA is applied in a concentration of 20 ppm under typical industrial batch plant process conditions, surprisingly the polycondensation time is not different than when phosphoric acid is used at 10 ppm. The color of the CEPA containing PTT is significantly better than the phosphoric acid containing PTT and comparable to PTT chips produced with virgin PDO. Under these process conditions a lower CEPA feed is sufficient to get the same acrolein reduction in the PTT compared to when batches of virgin PDO was used.

was in accordance with the process of the present invention for the CEPA and TEGPA phosphorus compounds tested, and not in accordance with the process of the present invention for the other phosphorus compounds tested, based on the structure of the phosphorus compounds tested.

The polymerizations described here were conducted in a batch pilot plant facility designed to make about 120 Kg/batch, which consisted of a paste feed (TPA and PDO mixed in paste form) vessel, an esterification/prepolymerization vessel, and a polycondensation reactor designed to generate a renewable high surface area under vacuum. About 27 Kg of PDO and 47.5 Kg of TPA were charged to the feed vessel and stirred to make a paste slurry. To this slurry was added Ti butoxide catalyst in acetic acid/PDO solution (about 20 ppm Ti based on TPA), hindered phenol stabilizer Irganox 1076 (0.025% to 0.1% based on the weight of the final polymer) and 0.5 ppm silicon-based antifoam agent. Optionally, cobalt acetate (typically 5-20 ppm Co based on TPA) was also added to improve the color of the polymer. The total PDO/TPA molar ratio charged to the esterification reactor was about 1.25. In the esterification stage, this paste mixture was added slowly over about 70 to 90 minutes to about 60 Kg of PTT oligomer prepared in the previous batch and heated at about 255-260° C. at about 1.5 bar (0.15 MPa) pressure. The instantaneous oligomer to feed weight ratio during the feed addition was always >1 and typically >20. Water, PDO, and byproducts were distilled off and after a total of about 130-170 minutes, additional catalyst was added (40-100 ppm Ti based on TPA charged). The prepolymerization was conducted at about 255° C. in the same reactor by reducing the pressure gradually over 15-20 minutes to about 50 mbar (500 Pa) and after 30-40 minutes, approximately one-half of the reactor contents was transferred to the polycondensation reactor and the pressure further reduced from about 450 mbar (450 Pa) to <5 mbar (<50 Pa). After about 130 to 290 minutes at about 250-260° C. when the intrinsic viscosity (IV) of the polymer had reached the desired value (target 0.92 dl/g IV), the mixing was stopped and the melt polymer was discharged through a die using a melt pump into a strand pelletizing system wherein the melt streams were cooled in a water bath to form solid polymer strands that were fed to a pelletizer (cutter). The discharge/pelletizing step took 20-40 minutes to complete. The pellets were then fed to a crystallization unit in which the pellets were exposed to hot water at 75-90° C. for up to 2 minutes. The pellets were then dried.

In general, when additives were added or changed, the amount added to the feed or reactor was adjusted to take into account the oligomer "heel" remaining from the previous batch and several batches, typically three to six, were conducted to approach a steady state composition.

Compounds used:

Irgafos 168** = tris(2,4-di-t-butylphenyl)phosphite
CEPA* = 2-carboxyethylphosphonic acid/3-phosphonopropionic acid HO$_2$CCH$_2$CH$_2$P(O)(OH)$_2$
TEPA** = triethyl phosphonoacetic acid (Rhodia) (EtO)$_2$P(O)CH$_2$CO$_2$Et -continued Compounds used:

TIOP** = triisooctyl phosphite
Sodium phosphite**
Phosphoric acid**
TEGPA* = tristri(ethylene glycol)phosphate / ethoxylated phosphoric acid / FOSFATEG p-96 (Comercial Quimica Masso, S.A.)

*denotes that the process using this P compound is in accordance with the present invention
**denotes that the process using this P compound is not in accordance with the present invention.

The following Table 10 summarizes representative batches prepared under the conditions described above with various phosphorus compounds. Phosphorus compound amounts charged were calculated to give about 24 ppm P in the final product, except as noted. Except as noted, hindered phenol stabilizer Irganox 1076 (at 0.025 wt %) and Co acetate (10-20 ppm Co) were added as well. LiOH was included in some control batches, as noted, but did not affect the acrolein. The acrolein level is the amount measured (by GC headspace under N2) in the pellets 15 minutes after the start of the discharge/pelletizing step.

TABLE 10

Amount of Acrolein (ppm)

| Residence Time (min) | IV (dl/g) | Controls | Irgafos 168 | CEPA | TEPA | TEGPA | Sodium Phosphite | TIOP | H3PO4 | Batch No. | Comments |
|---|---|---|---|---|---|---|---|---|---|---|---|
| 129 | 0.94 | | | | | | 27.4 | | | 2846 | |
| 132 | 0.91 | | 15.6 | | | | | | | 2830 | |
| 135 | 0.73 | | | | | | 30.9 | | | 2845 | |
| 136 | 0.89 | | 11.7 | | | | | | | 2831 | |
| 142 | 0.84 | | | | | 19.3 | | | | 2848 | |
| 144 | 0.92 | | | | | | | | 17.8 | 2740X | |
| 145 | 0.95 | | | | | | | | 18.3 | 2741 | 12 ppm P |
| 146 | 0.93 | | | | | | 21.0 | | | 2847 | |
| 152 | 0.94 | 23.5 | | | | | | | | 2803 | |
| 153 | 0.97 | 25.4 | | | | | | | | 2708 | 0% 1076 & Co |
| 158 | 0.94 | | 16.4 | | | | | | | 2817 | |
| 167 | 0.93 | 26.2 | | | | | | | | 2805 | |
| 167 | 0.97 | 24.3 | | | | | | | | 2806 | |
| 174 | 0.89 | | | 7.5 | | | | | | 2832 | |
| 176 | 0.96 | | 14.1 | | | | | | | 2818 | |
| 179 | 0.94 | | 12.3 | | | | | | | 2809 | |
| 179 | 0.95 | | | | 14.8 | | | | | 2746X | |
| 180 | 0.94 | | | | | 8.7 | | | | 2852 | |
| 183 | 0.92 | | | | | 11.7 | | | | 2851 | |
| 187 | 0.94 | 27.5 | | | | | | | | 2616 | 0.1% 1076 |
| 190 | 0.85 | | 14.6 | | | | | | | 2627 | 0.05% 1076 |
| 190 | 0.87 | | 13.8 | | | | | | | 2716 | |
| 190 | 0.89 | | 14.4 | | | | | | | 2720 | |
| 190 | 0.86 | | 10.6 | | | | | | | 2723 | 36 ppm P 0.05% 1076 |
| 190 | 0.88 | | 10.6 | | | | | | | 2728 | 36 ppm P |
| 190 | 0.87 | | | | | | | 15.8 | | 2734 | |
| 195 | 0.94 | 19.4 | | | | | | | | 2840 | |
| 200 | 0.95 | 22.3 | | | | | | | | 2842 | LiOH |
| 201 | 0.92 | | 7.8 | | | | | | | 2810 | |
| 206 | 0.97 | | 6.9 | | | | | | | 2814 | |
| 209 | 0.87 | | | 6.8 | | | | | | 2837 | 36 ppm P |
| 210 | 0.92 | | 10.9 | | | | | | | 2811 | |
| 212 | 0.89 | 13.6 | | | | | | | | 2853C | |
| 213 | 0.87 | | | 7.5 | | | | | | 2833 | |
| 214 | 0.92 | | 10.0 | | | | | | | 2815 | |
| 216 | 0.93 | | 9.3 | | | | | | | 2812 | |

TABLE 10-continued

Amount of Acrolein (ppm)

| Residence Time (min) | IV (dl/g) | Controls | Irgafos 168 | CEPA | TEPA | TEGPA | Sodium Phosphite | TIOP | H3PO4 | Batch No. | Comments |
|---|---|---|---|---|---|---|---|---|---|---|---|
| 218 | 0.89 | | 12.1 | | | | | | | 2822 | |
| 218 | 0.94 | | 12.2 | | | | | | | 2826 | |
| 224 | 0.95 | | 9.1 | | | | | | | 2816 | |
| 224 | 0.93 | | | | | 15.6 | | | | 2849 | |
| 228 | 0.94 | | 10.8 | | | | | | | 2813 | |
| 244 | 0.86 | | | 5.8 | | | | | | 2834 | |
| 249 | 0.93 | | 13.1 | | | | | | | 2824 | |
| 255 | 0.80 | | | 5.4 | | | | | | 2836 | 36 ppm P |
| 259 | 0.89 | | | | | 7.2 | | | | 2850 | |
| 260 | 0.90 | | | | | | | 12.3 | | 2844 | |
| 286 | 0.79 | | | 6.2 | | | | | | 2835 | 36 ppm P |

Controls: The batches made without phosphorus additives clearly show higher levels of acrolein in the pellets and these levels decline with increasing residence time of the polycondensation stage (and the molecular weights obtained at long reactions times were similar to those obtained at short residence times). Added LiOH did not affect the acrolein level and these batches are included in the controls.

Sodium phosphite: The acrolein levels are not significantly different from those of the control batches. Therefore, sodium phosphite is considered not effective under these conditions.

Irgafos 168 and CEPA: Acrolein levels were significantly reduced at all residence times. CEPA appeared to be more effective than Irgafos 168 but, as shown in Table 11, the amount of phosphorus in the polymer was also somewhat higher with CEPA.

Phosphoric acid: Based on the limited data, the acrolein suppression with phosphoric acid appears to be similar to that of Irgafos 168.

TEGPA: Three of four data points suggest that TEGPA may be similar in effect to Irgafos 168 and CEPA.

TEPA: Limited data suggests similar effect to that of Irgafos 168.

TIOP: Limited data suggests similar effect to that of Irgafos 168.

As shown in Table 11, compared to the calculated charged amount of phosphorus, the actual level of phosphorus (corrected) in the polymer was higher with CEPA than with Irgafos 168 and sodium phosphite (the phosphorus data in Table 11 are based on the phosphorus level in the PTT pellets made; the analytical method used measured 9 ppm phosphorus even when none was added—see batch 2805—so 9 ppm had to be subtracted; some of the corrected phosphorus levels are less than the calculated amount because some of the phosphorus species were lost in the overhead). Also, analysis of the PDO distillates showed some phosphorus when Irgafos 168 was used and little or none with CEPA. This indicates that more of the phosphorus compound stayed with the polymer in the case of CEPA.

TABLE 11

| Batch | Additive | P, calc. (ppm) | P, measured (ppm) | P, corrected (ppm) | Ti, calc. (ppm) | Ti, measured (ppm) |
|---|---|---|---|---|---|---|
| 2805 | None | 0 | 9 | 0 | 60 | 57 |
| 2805 | None | 0 | 9 | 0 | 60 | 58 |
| 2818 | Irgafos 168 | 24 | 23 | 14 | 80 | 75 |
| 2825 | Irgafos 168 | 24 | 26 | 17 | 120 | 114 |
| 2834 | CEPA+ | 24 | 39 | 30 | 80 | 83 |
| 2837 | CEPA+ | 36 | 52 | 43 | 150 | 108 |
| 2842 | LiOH | 0 | 10 | 1 | 80 | 85 |
| 2847 | Na phosphite | 24 | 27 | 18 | 80 | 99 |
| 2852 | TEGPA+ | 24 | 29 | 20 | 60 | 59 |

+indicates samples in accordance with the present invention

EXAMPLE 9

Pilot Scale POY Test of Bright PTT with 36 ppm P of CEPA, Standard Spinning Process, One Thread The PTT polymer chips of comparative sample C-4 and invention sample I-4 were dried in a tumble dryer at a temperature of 130° C. to a water content of 12 ppm. Before spinning, the filterability of the PTT was tested. The dry chips were melted in a laboratory extruder (throughput 2 kg/h) and metered through a disc filter with a mesh size of 15 μm and a filter area of 2.83 cm² by means of a gear pump at a temperature of 260° C. The increase in pressure before the filter was recorded in relation to the amount of melt conveyed and the filterability is calculated as filter value (FV): FV=filter pressure [bar]·filter area [cm²]/amount of melt [kg].

The filter value of the PTT containing 36 ppm P of CEPA (invention sample I-3) of 3 bar·cm²/kg (0.3 MPa cm²/kg) was excellent for downstream yarn processing. The value for the comparative sample C-4 with ppm P of phosphoric acid was good as well.

The filter value of the invention sample I-4, produced with 50% process PDO, shows that the PDO recycling conditions do not have a negative influence on the filterability of the PTT (Table 12).

TABLE 12

| Base mat. P-Additive | | Chips from Ex. C-2 10 ppm P/H₃PO₄ | Chips from Ex. I-3 36 ppm P/CEPA | Chips from Ex. I-4 20 ppm P/CEPA |
|---|---|---|---|---|
| Filter value | bar · cm²/kg | 6 | 3 | 4 |

For spinning, the chips were melted in a 3E4 extruder from the firm Barmag so that the temperature of the melt was 254° C. The melt was then conveyed through a product line and fed to the spinning pump wherein the melt throughput to the spin pack was controlled to 76.1 g/min. The melt was extruded through a nozzle plate 80 mm in diameter, with 48 holes 0.25 mm in diameter, and a length of 0.75 mm. The nozzle pressure was approximately 120 bar (1.2 MPa).

Subsequently, the filaments were cooled off in a crossflow quench system having a length of 1500 mm. The cooling air had a speed of 0.55 m/sec., a temperature of 18° C., and a relative humidity of 80%. The filaments were provided with spin finish Goulston Lurol PT7087 and bundled with the help of an oiling device at a distance of 1500 mm from the nozzle. The oiling device was provided with a TriboFil surface. The quantity of spin finish applied amounted to 0.40% in relation to the weight of the thread.

Thereafter the bundled multi-filament yarn was passed through a godet system consisting of two non-heated godets. The speed at the first godet was 2,987 m/min and the speed at the second godet was 3,000 m/min.

Finally the multi-filament yarn was wound on a type SW6 winder from BARMAG at a winding speed of 3,075 m/min. For comparison, PTT chips containing phosphoric acid/10 ppm P were spun at the same conditions. The results are shown in table 13.

TABLE 13

| | | POY spinning test Properties of PTT POY | |
|---|---|---|---|
| Base mat. Additive | | Chips from Ex. I-3 36 ppm P/CEPA | Chips from Ex. C-2 10 ppm P/H₃PO₄ |
| Titer | dtex | 101 | 101 |
| RF | cN/tex | 21.9 | 22.3 |
| cv | % | 2.6 | 3.1 |
| Elong. | % | 82.6 | 77.9 |
| cv | % | 3.9 | 5.1 |
| U, HI | % | 0.58 | 0.50 |
| U, NT | % | 1.43 | 1.57 |
| BWS (after Prod.) % | | 52.1 | 49.8 |

As demonstrated above, there are no significant differences in properties between the yarns of CEPA and phosphoric acid containing PTT even though the color value of the CEPA PTT is better than the color value of the H₃PO₄ PTT.

We claim:

1. A process of reducing acrolein byproduct from polytrimethylene terephthalate, comprising contacting a phosphorus compound selected from the group consisting of a phosphorous compound of formula I, a phosphorous compound of formula II, a phosphorous compound of formula III, a phosphorous compound of formula IV, a phosphorous compound containing an aromatic acid, a phosphate containing a hydroxyalkyl group, carboxyethyl phosphonic acid and its corresponding esters with 1,3-propanediol, triethyl-3-phosphonopropionate, 3-hydroxypropyl phosphonoacetate, 3-hydroxypropyl phosphate, and tetraethyl methylenediphosphonate with a) 1,3-propanediol, terephthalic acid, and/or polytrimethylene terephthalate in a process of producing polytrimethylene terephthalate; or b) 1,3-propanediol, dimethylterephthalate, and/or polytrimethylene terephthalate in a process of producing polytrimethylene terephthalate; or c) molten polytrimethylene terephthalate to produce polytrimethylene terephthalate, wherein at least 1 ppm of phosphorous, based on the total amount of polytrimethylene terephthalate, is retained in the polytrimethylene terephthalate; at least about 70% by weight of the phosphorus in the phosphorus compound is retained in the polytrimethylene terephthalate; and the amount of acrolein in the polytrimethylene terephthalate is decreased; wherein:

formula I is $$A-O-B-O-C \qquad (I)$$

wherein A is a phosphate, phosphonate, or phosphite moiety, B is the residuum of 1,3-propanediol, and C is hydrogen or a carboxylate ester moiety;

formula II is $$Y-O-R'-O-Z \qquad (II)$$

wherein Y is a phosphate, phosphonate, or phosphite moiety, R' is the residuum of an aliphatic glycol having from 2 to 12 carbon atoms, and Z is hydrogen or a carboxylate ester moiety;

formula III is

(III)

wherein R is an aliphatic group having 1-12 carbons, and R₁ and R₂, independently, are hydrogen or an alkyl or aryl moiety having 1-20 carbons; and wherein formula IV is

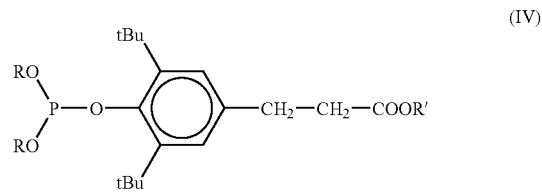

(IV)

wherein R and R', independently, are aliphatic moieties having 1-12 carbons.

2. The process of claim 1 wherein the amount of phosphorus retained in the polytrimethylene terephthalate is from about 5 ppm to about 50 ppm.

3. The process of claim 1 wherein when a process of producing polytrimethylene terephthalate from 1,3-propanediol and terephthalic acid or dimethylterephthalate is carried out in continuous mode, the feed molar ratio of 1,3-propanediol to terephthalic acid or dimethylterephthalate is from about 1.1:1 to below about 1.5:1, and when the process is carried out in batch mode, the feed molar ratio of 1,3-propanediol to terephthalic acid or dimethylterephthalate is from about 1.1:1 to below about 1.4:1.

4. The process of claim 1 wherein Y of formula II is a phosphonocarboxylate of formula V

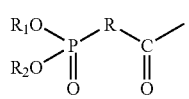

(V)

wherein R is a divalent aliphatic group having from 1 to 20 carbon atoms or a divalent aromatic group having at least 5 carbon atoms, $R_1$ and $R_2$ are each, independently, hydrogen or $C_1$ to $C_{20}$ alkyl or aryl.

5. The process of claim 1 wherein at least a part of the 1,3-propanediol is removed as vapor in a process of producing polytrimethylene terephthalate and the vapor is condensed, collected, and recycled back to the process.

6. The process of claim 5 wherein the phosphorus compound is fed to the condensed 1,3-propanediol before it is recycled.

7. The process of claim 1 wherein a process of producing polytrimethylene terephthalate is conducted in the presence of a catalytic metal compound.

8. The process of claim 7 wherein the phosphorus to catalyst metal molar ratio is from about 0.1 to about 2.

9. The process of claim 1 wherein the phosphorus compound is contacted with 1,3-propanediol and terephthalic acid in a process of esterification prior to polycondensation of an ester produced by the esterification process to polytrimethylene terephthalate.

10. The process of claim 1 wherein the phosphorus compound is contacted with 1,3-propanediol and dimethylterephthalate in a process of transesterification prior to polycondensation of an ester produced by the transesterification process to polytrimethylene terephthalate.

11. The process of claim 1 wherein the phosphorus compound is contacted with polytrimethylene terephthalate in a process of pre-polycondensation or polycondensation of said polytrimethylene terephthalate.

12. The process of claim 1 wherein the molten polytrimethylene terephthalate is polycondensed polytrimethylene terephthalate still in molten form from polycondensation.

13. The process of claim 1 wherein the molten polytrimethylene terephthalate is derived by reducing pelletized polytrimethylene terephthalate to molten form.

14. The process of claim 1 wherein less than about 20 parts per million acrolein is retained in the polytrimethylene terephthalate.

15. The process of claim 1 wherein the amount of phosphorus retained in the polytrimethylene terephthalate is at least 10 ppm and the amount of acrolein in said polytrimethylene terephthalate is decreased thereby by at least 10% by weight of the acrolein.

* * * * *